(12) United States Patent
Seebauer

(10) Patent No.: US 8,864,201 B2
(45) Date of Patent: Oct. 21, 2014

(54) SUCTION LIFTING TOOL AND SEALING FLANGE FOR A SUCTION LIFTING TOOL

(71) Applicant: Ralf Seebauer, Murrhardt (DE)

(72) Inventor: Ralf Seebauer, Murrhardt (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 13/956,528

(22) Filed: Aug. 1, 2013

(65) Prior Publication Data

US 2014/0035304 A1  Feb. 6, 2014

(30) Foreign Application Priority Data

Aug. 1, 2012  (DE) .......................... 10 2012 107 050

(51) Int. Cl.
  *B66C 1/02*  (2006.01)
  *B65G 49/06*  (2006.01)
  *F16B 47/00*  (2006.01)

(52) U.S. Cl.
  CPC ............. *B66C 1/0293* (2013.01); *F16B 47/006* (2013.01)
  USPC .......................................... 294/187; 294/189

(58) Field of Classification Search
  USPC ................... 294/183, 187, 189; 248/205.8
  See application file for complete search history.

(56) References Cited

U.S. PATENT DOCUMENTS

| | | | | |
|---|---|---|---|---|
| 2,351,666 A | * | 6/1944 | Cohen | 294/187 |
| 2,871,054 A | * | 1/1959 | Zinke | 294/187 |
| 3,152,828 A | * | 10/1964 | Lytle | 294/189 |
| 5,909,758 A | * | 6/1999 | Kitamura | 16/406 |
| 7,004,521 B2 | * | 2/2006 | Ishii | 294/187 |
| 8,104,809 B1 | * | 1/2012 | Mayhugh | 294/187 |
| 2007/0075196 A1 | * | 4/2007 | Richter | 248/205.8 |
| 2011/0315839 A1 | | 12/2011 | Chen | |
| 2012/0193500 A1 | * | 8/2012 | Kniss et al. | 248/363 |

FOREIGN PATENT DOCUMENTS

| | | |
|---|---|---|
| DE | 1092618 B | 11/1960 |
| DE | 2723616 A1 | 12/1978 |
| DE | 3317469 C1 | 8/1984 |
| DE | 102006020032 A1 | 10/2007 |
| DE | 202007015255 U1 | 11/2008 |
| DE | 202010005517 U1 | 9/2010 |
| EP | 0125550 A1 | 11/1984 |
| EP | 1770285 A1 | 4/2007 |
| EP | 2434169 A1 | 3/2012 |
| JP | S5053288 U | 5/1975 |
| JP | S6438313 U | 3/1989 |
| JP | 2001205586 A | 7/2001 |

* cited by examiner

*Primary Examiner* — Dean Kramer
(74) *Attorney, Agent, or Firm* — St. Onge Steward Johnston & Reens LLC

(57) ABSTRACT

A suction lifting tool for fastening an article on a surface of an object, the suction lifting tool having a bowed suction housing which is closed off towards one side by a suction disk, wherein a cavity is formed between the suction housing and the suction disk, and having a tension lever for reducing a spacing between the suction housing and the suction disk to generate a suction effect, wherein a ring-shaped sealing flange is securable on the suction disk, having an inside groove on the sealing flange into which the suction disk is insertable by way of its outside edge, and which has an elastic sealing face for abutment against the surface of the object in order to enable fastening to strongly bowed surfaces in this manner.

11 Claims, 2 Drawing Sheets

SUCTION LIFTING TOOL AND SEALING FLANGE FOR A SUCTION LIFTING TOOL

BACKGROUND OF THE INVENTION

The invention relates to a suction lifting tool for fastening an article on a surface of an object, said suction lifting tool having a bowed suction housing which is closed off towards one side by means of a suction disk, wherein a cavity is formed between the suction housing and the suction disk, and having a tension lever for reducing a spacing between the suction housing and the suction disk to generate a suction effect.

These types of suction lifting tools have been known for a long time and are used in order to fasten articles by means of suction effect, as a rule, on a smooth, level surface of an object. Such suction lifting tools are used, in particular, in the handling of panes of glass.

If the glass has to be removed from vehicle windscreens in the event of a defect, suction lifting tools are used in part in this case also.

Insofar as the surface of the object on which the suction lifting tool is to be fastened is smooth and even, a sufficient suction effect can be obtained without any problem. In the event of bowed surfaces, however, it is frequently no longer possible to obtain a sufficient holding force.

SUMMARY OF THE INVENTION

In view of this it is a first object of the invention is to disclose an improved suction lifting tool, by way of which secure fastening both on even surfaces and on non-even surfaces, such as, for instance, bowed surfaces, can be ensured.

It is a second object of the invention to disclose an improved suction lifting tool which is reliable and sturdy.

It is a third object of the invention to disclose an improved suction lifting tool which allows for a very reliable clamping on uneven surfaces.

It is a fourth object of the invention to disclose an improved suction lifting tool which is particularly suited for use on curved automobile windshields.

Where possible in this respect, it should be possible to use a conventionally available suction lifting tool which can be correspondingly retrofitted.

According to one aspect of the invention, these and other objects are achieved by a suction lifting tool for fastening an article on a surface of an object, said suction lifting tool comprising:

a bowed suction housing having one open end formed by an annular rim;

a pin extending axially through said suction housing and carrying a suction disk at one end for closing off said open end of said suction disk, a cavity being formed between said suction housing and said suction disk;

a tension lever arranged outside said suction housing and having a pivot connection to said pin at a second end thereof outside said suction housing, said suction lever allowing to axially move said pin for reducing a spacing of said cavity between said suction housing and said suction disk to generate a suction effect.

a ring-shaped sealing flange being secured on said suction disk in a sealing manner between said annular rim of said suction housing and said suction disk, said sealing flange comprising an inside groove for securing said suction disk at an outer rim thereof, said sealing flange further comprising an outer elastic sealing face for abutment against a surface of an object to which said suction lifting tool is to be attached. said object is achieved in the case of a suction lifting tool according to the aforementioned type by a ring-shaped sealing flange which is securable on the suction disk of the suction lifting tool, having an inside groove on the sealing flange into which the suction disk is insertable by way of its outside edge, and which has an elastic sealing face for abutment against the surface of the object.

The object of the invention is achieved in this manner.

According to the invention, a suction lifting tool according to the prior art can be combined with a ring-shaped sealing flange in order to achieve more secure fastening even on bowed surfaces or surfaces which are uneven in another manner.

In this case, the suction lifting tool can be used both in its initial state without the sealing flange, insofar as only fastening on even surfaces is necessary, and with a sealing flange fitted thereon in order to enable fastening on surfaces which are not sufficiently even.

The suction lifting tool with the sealing flange is larger and heavier than without the sealing flange and is also less steady than without the sealing flange. For this reason, use is sensible both with the sealing flange, for instance when a large degree of flexibility is required, for instance in the case of bowed disks. On the other hand, use is also sensible without a sealing flange when, for instance, a lower weight, a higher lever of stability or a smaller suction face is required, such as, for example, can be the case when removing the glass from small side panes in the case of passenger vehicles.

The sealing flange has a ring-shaped inside groove for fastening on an outside edge of a suction disk of a suction lifting tool such that the outside edge is received in a sealing manner in the inside groove, and has an elastic, outwardly protruding sealing face for abutment against a surface of an object.

According to a further development of the invention, the sealing flange can be inserted in a sealing manner between an edge of the suction housing and the suction disk.

In an expedient manner in this respect, the sealing flange has an inside groove which is U-shaped in cross section and is matched to the cross section of the outside edge of the suction disk.

In a further preferred development of the invention, the sealing flange has a sealing face which protrudes outwards in relation to the outside edge of the suction disk.

In order to enable sufficient flexibility, the sealing flange preferably consists of rubber or a rubber-elastic plastics material.

It is obvious that the features of the invention mentioned above and those yet to be explained below can not only be used in the combination provided in each case but also in other combinations or standing alone without departing from the framework of the present invention.

BRIEF DESCRIPTION OF THE DRAWINGS

Further features and advantages of the invention are produced from the following description of a preferred exemplary embodiment with reference to the drawing, in which.

DETAILED DESCRIPTION OF THE INVENTION

Figure 1:
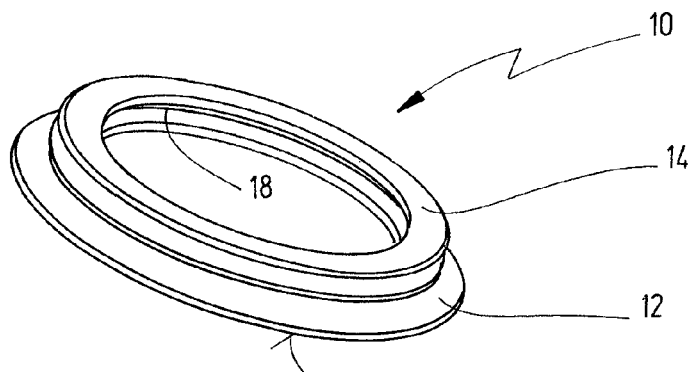
FIG. 1 shows a perspective view of a sealing flange according to the invention.

A perspective representation of a sealing flange according to the invention is shown in FIG. 1 and is designated overall by the reference numeral 10. The sealing flange 10 is ring-shaped and has a sealing portion 12 with a ring-shaped, even surface 16, to which a fastening portion 14 with a smaller outside diameter connects, a ring-shaped inside groove 18 being provided in said fastening portion.

Figure 2:
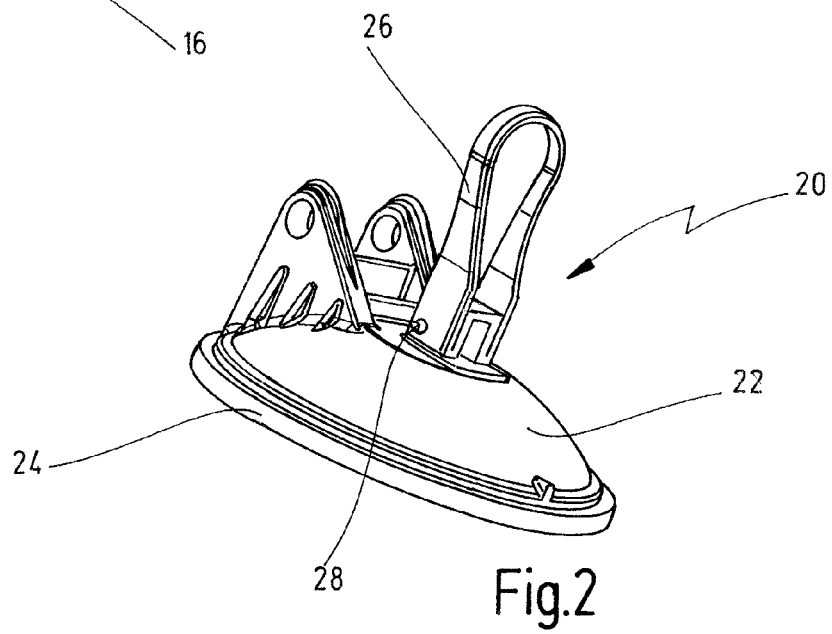
FIG. 2 shows a perspective view of a conventional suction lifting tool which can be used in combination with the sealing flange according to FIG. 1.

FIG. 2 shows a perspective view of a conventional suction lifting tool 20 which can be used in conjunction with the sealing flange 10 according to FIG. 1.

The suction lifting tool 20 has a suction housing 22 of an elastic material which is bowed convexly outwards and is closed off at its front side by means of an elastic suction disk 24. A tension lever 26, which is pivotable about a pivot axis 28, as a result of which a cavity 40 (FIG. 4), which is enclosed between the suction disk 24 and the suction housing 22, is able to be reduced in order to obtain a suction effect, is located on the rear side of the suction housing 22. The suction lifting tool 20 can consequently be fastened on a smooth, even surface. As a result of the relatively small suction disk 24, fastening is still also possible, for instance, on fairly small side panes of passenger vehicles.

Figure 4:
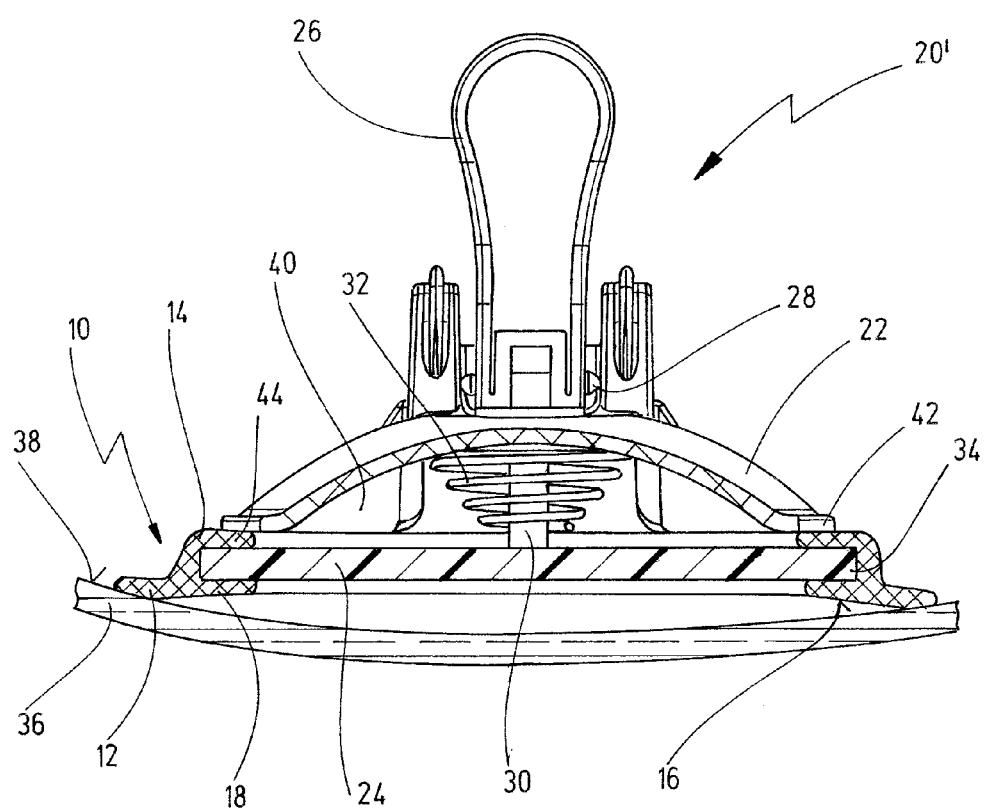

If, however, fastening is to be effected on surfaces which are not sufficiently even, the sealing flange 10 according to FIG. 4 is placed in such a manner on the outside edge 34 of the suction disk 24 that the suction disk 24 is held completely inside the U-shaped inside groove 18 of the sealing flange 10. In this case, a ring web 44, facing the suction housing 22, on the fastening portion 14 of the sealing flange 10 is enclosed in a sealing manner between an edge 42 of the suction housing 22 and the suction disk 24 such that the cavity 40 inside the suction lifting tool 20' is closed off between the suction housing 22, the sealing flange 10 and the suction disk 24.

On its side facing away from the suction housing 22, the sealing flange 10 has a ring-shaped, even sealing face 16 which serves for abutment against the surface 38 of an object 36.

In the case shown, the object 36 can be a bowed disk, for instance, on which the suction lifting tool 20' is to be fastened.

It can be seen in FIG. 4 that the suction disk 24 is coupled to the tension lever 26 on the rear side of the suction lifting tool 20' by means of a pin 30 in order to displace the suction disk 24 towards the suction housing 22 against the action of a spring 32 when the tension lever 26 is pivoted about the pivot axis 28 into a locking position such that the cavity 40 is reduced in order to bring about a suction effect.

Should the suction lifting tool 20' be used without the sealing flange 10 fitted thereon, the sealing flange 10, which consists of a sufficiently elastic material, can be pulled outwards from the outside edge 34 of the suction disk 24. The configuration of the suction lifting tool 20 according to FIG. 2, which is known in principle in the prior art and is suitable for fastening on even surfaces, is then produced.

The sealing flange 10 preferably consists of rubber or a rubber elastic plastics material of sufficient elasticity.

Should the sealing flange 10 be used in combination with the suction lifting tool 20 according to FIG. 2, the sealing flange 10 by way of its inside groove 18 is placed in position on the outside edge 34 of the suction disk 24 and the outside ring web 44 on the fastening portion 14 of the sealing flange 10 is inserted under the edge 42 of the suction housing 22 such that the position according to FIG. 4 is produced.

Figure 3:
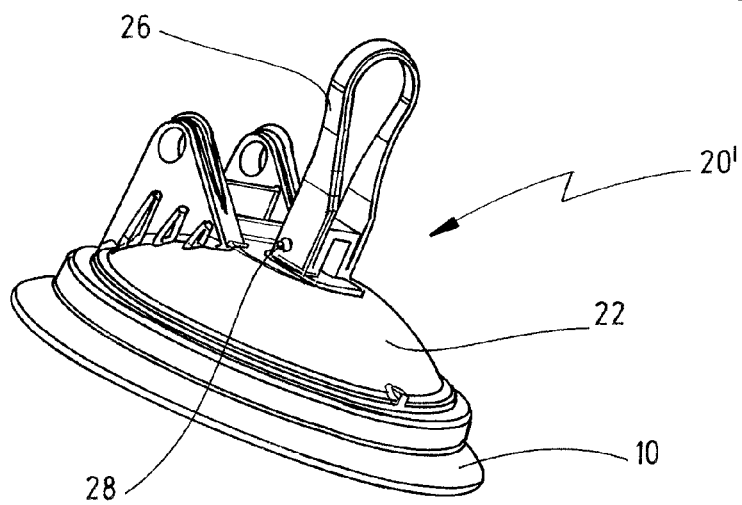
FIG. 3 shows a perspective view of a suction lifting tool according to FIG. 2 where the sealing flange according to FIG. 1 is fastened on the outside circumference of the suction disk of the suction lifting tool and FIG. 4 shows an enlarged cross section through the suction lifting tool according to FIG. 3 abutting against a glass surface.

As the suction lifting tool 20' according to FIG. 3 or 4 is enlarged by the sealing flange 10 additionally fitted thereon, said modified suction lifting tool 20' is no longer able to be used in all cases of application, for instance when particularly small side panes on passenger vehicles have to be removed. For this reason it is sensible to develop the sealing flange 10 as a removable element such that it is possible to use the suction lifting tool 20 or 20' with and without the sealing flange 10.

What is claimed is:

1. A suction lifting tool for fastening an article on a surface of an object, said suction lifting tool comprising:
   a bowed suction housing having one open end formed by an annular rim;
   a pin extending axially through said suction housing and carrying a suction disk at one end for closing off said open end of said suction housing, a cavity being formed between said suction housing and said suction disk;
   a tension lever arranged outside said suction housing and having a pivot connection to said pin at a second end thereof outside said suction housing, said tension lever allowing to axially move said pin for reducing a spacing of said cavity between said suction housing and said suction disk to generate a suction effect;
   a ring-shaped sealing flange being detachably secured on said suction disk in a sealing manner between said annular rim of said suction housing and said suction disk, said sealing flange comprising an inside groove for securing said suction disk at an outer rim thereof, said sealing flange further comprising an outer elastic sealing face for abutment against a surface of an object to which said suction lifting tool is to be attached;
   wherein said inside groove of said sealing flange is configured U-shaped in cross section and is matched to a cross section of said annular rim of said suction disk.

2. The suction lifting tool of claim 1, wherein said elastic sealing face of sealing flange protrudes outwardly beyond said suction disk.

3. The suction lifting tool of claim 2, wherein said sealing flange is made of a material selected from the group consisting of rubber and a rubber-elastic plastics material.

4. The suction lifting tool of claim 1, wherein said sealing flange is made of a material selected from the group consisting of rubber and a rubber-elastic plastics material.

5. A suction lifting tool for fastening an article on a surface of an object, said suction lifting tool comprising:
   a bowed suction housing having one open end formed by an annular rim;
   a pin extending axially through said suction housing and carrying a suction disk at one end for closing off said open end of said suction housing, a cavity being formed between said suction housing and said suction disk;
   a tension lever arranged outside said suction housing and having a pivot connection to said pin at a second end thereof outside said suction housing, said tension lever allowing to axially move said pin for reducing a spacing of said cavity between said suction housing and said suction disk to generate a suction effect;
   a ring-shaped sealing flange being secured on said suction disk in a sealing manner between said annular rim of said suction housing and said suction disk, said sealing flange comprising an inside groove for securing said suction disk at an outer rim thereof, said sealing flange further comprising an outer elastic sealing face for abutment against a surface of an object to which said suction lifting tool is to be attached.

6. The suction lifting tool of claim 5, wherein said sealing flange is arranged detachably from said suction disk.

7. The suction lifting tool of claim 5, wherein said inside groove of said sealing flange is configured U-shaped in cross section and is matched to a cross section of said annular rim of said suction disk.

8. A sealing flange in a suction lifting tool for fastening an article on a surface of an object, said suction lifting tool comprising:

a bowed suction housing having one open end formed by an annular rim;

a pin extending axially through said suction housing and carrying a suction disk at one end for closing off said open end of said suction housing, a cavity being formed between said suction housing and said suction disk;

a tension lever arranged outside said suction housing and having a pivot connection to said pin at a second end thereof outside said tension housing, said suction lever allowing to axially move said pin for reducing a spacing of said cavity between said suction housing and said suction disk to generate a suction effect;

wherein said sealing flange is configured ring-shaped for being secured on said suction disk in a sealing manner between said annular rim of said suction housing and an annular rim of said suction disk, said sealing flange comprising an inside groove mated to said suction disk for securing said suction disk at an outer rim thereof, said sealing flange further comprising an outer elastic sealing face for abutment against a surface of an object to which said suction lifting tool is to be attached.

9. The sealing flange of claim 8, wherein said inside groove is configured U-shaped in cross section and is matched to said cross section of said outer rim of said suction disk.

10. The sealing flange of 9, wherein said sealing flange consists of rubber or a rubber-elastic plastics material.

11. The sealing flange of claim 8, wherein said sealing flange consists of rubber or a rubber-elastic plastics material.

* * * * *